United States Patent
Buell

[15] 3,684,764
[45] Aug. 15, 1972

[54] BRIGHTENING POLYVINYL CHLORIDE AND POLYOLEFIN PLASTICS WITH 2-NAPHTHYLNAPHTHOXAZOLES

[72] Inventor: Bennett George Buell, 311 Mountain Ave., Apt. C8, Bound Brook, N.J. 08805

[22] Filed: April 13, 1970

[21] Appl. No.: 28,147

[52] U.S. Cl..................260/45.8 NZ, 252/301.2 W
[51] Int. Cl..............................................C08f 45/67
[58] Field of Search..............260/45.8 NZ, 307 D; 252/301.2 W

[56] References Cited

UNITED STATES PATENTS

| | | |
|---|---|---|
| 3,336,330 | 8/1967 | Schinzel et al............260/307 |
| 3,242,807 | 3/1966 | Klass et al...................88/106 |
| 3,526,768 | 9/1970 | Rai et al. ....................250/71 |
| 3,429,877 | 2/1969 | Maeder et al..............260/240 |
| 3,293,258 | 12/1966 | Siegrist et al. .............260/307 |
| 3,347,694 | 10/1967 | Okubo et al..............117/33.5 |

*Primary Examiner*—Donald E. Czaja
*Assistant Examiner*—R. A. White
*Attorney*—John L. Sullivan

[57] ABSTRACT

Polyvinyl chloride and polyolefin plastics such as polyethylene are brightened by incorporating uniformly therein about 0.01 to 0.5 percent by weight of a 2-naphthylnaphthoxazole or a dichloro-2-naphthylnaphthoxazole.

3 Claims, No Drawings

BRIGHTENING POLYVINYL CHLORIDE AND POLYOLEFIN PLASTICS WITH 2-NAPHTHYLNAPHTHOXAZOLES

This invention relates to the brightening of translucent plastics such as polyvinyl chloride, polystyrene, poly(methylmethacrylate), and polyolefin plastics, such as polyethylene, polypropylene, and the like. It is based on the discovery that these plastics can be brightened by uniformly incorporating therein, in the brightening quantities hereinafter described, a 2-naphthylnaphthoxazole or the chlorination product thereof. The invention includes the brightened plastics themselves, methods wherein they are brightened by incorporating one or more of these compounds therein, and also the 2-napthyl-naphthoxazoles and their chlorination products as new chemical compounds.

The brightening of textile fibers and fabrics by applying optical brightening or whitening agents to the surfaces thereof is well known, and several entire classes of brightening agents are known to be effective for this purpose. The brightening of plastics intended for molding, casting or extrusion into relatively thick pieces or sections presents, however, an essentially different problem, for the brightening agents are distributed more or less uniformly throughout the substance of these plastics instead of being located on their surfaces. They brighten the plastics by fluorescing after absorption of light in the ultra-violet wavelengths, and the visual appearance of the brightened plastic therefore depends on such factors as the particular wavelength of fluorescence of the added brightener, the color and nature of the plastic substrate in which it is incorporated, and also the compatibility and affinity of the brightener with and for the particular plastic. Stability of the brightener to heat, and particularly to light when incorporated into the plastic, is also an important factor, as it may determine the effective life of the brightened material.

It is evident, therefore than an effective brightener for any particular plastic must be highly specific in character, and cannot be predicted on the basis of its chemical structure alone. On the contrary, each compound must be evaluated individually on the basis of its behavior in each type of plastic.

I have found that the 2-naphthylnaphthoxazoles and their chlorination products, which are dichloro-2-naphthyl-naphthoxazoles, will meet all of the above-described requirements when incorporated uniformly into polyvinyl chloride and polyolefin plastics in small amounts. They brighten polyvinyl chloride and cause it to appear more clear than a control sample containing no brightener. Polyethylene containing them is much whiter and is also considerably faster to light than the untreated substrate. These results are obtained when the brightening compounds are present in quantities within the range of about 0.01 to 0.5 percent and preferably 0.02 to 0.1 percent based on the weight of the plastic, which quantities are sometimes hereinafter described as brightening amounts.

The 2-naphthylnaphthoxazoles are compounds of the formula

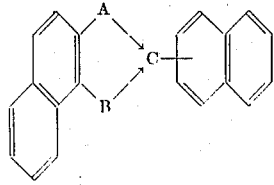

in which A is one member of the group consisting of oxygen bonded singly to the oxazole carbon atom C and nitrogen bonded doubly to the same carbon atom and B is the other member of this group, the oxazole carbon atom being linked to either the alpha or beta position of the adjacent naphthyl radical. They are prepared by reacting either 1-naphthoyl chloride or 2-naphthoyl chloride with either 1-amino-2-naphthol or 2-amino-1-naphthol, preferably by refluxing in pyridine, to form an amide which is ring-closed to the corresponding naphthoxazole by pyrolysis or by fusion with acid agents such as boric acid at temperatures within the range of about 230°-300°C. They may be purified by recrystallization from methoxyethanol.

One chlorine atom is taken up by each of the two naphthalene residues when these compounds are chlorinated. This may be done by dissolving them in an appropriate solvent such as chloroform and introducing gaseous chlorine at room temperature. Upon completion of the chlorine absorption the solvent is removed and the product is purified by recrystallization. The chlorine atoms occupy the 5 position of the naphthoxazole and the 4 position of the 2-naphthyl radical and therefore the products are 2-(4-chloronaphthyl)-5-chloronaphthoxazoles.

The new compounds are preferably added to the polyvinyl chloride or polyolefin plastics in finely divided form, and may be incorporated along with other additives such as pigments and the like. In most cases the brightener is distributed uniformly throughout the plastic on heated rolls, using the conditions described in the following examples. The fluorescent hue imparted thereby is a true blue fluorescence which causes the plastic to appear brighter without discoloration.

The invention will be further described and illustrated by the following specific examples to which, however, it is not limited.

EXAMPLE 1

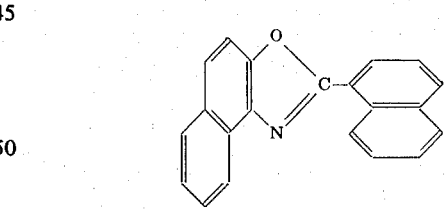

To 50 ml. thionyl chloride is added 3.44 g. (0.02 mole) of 1-naphthoic acid. When conversion to the acid chloride is complete it is isolated; then 3.91 g. (0.02 mole) of 1-amino-2-naphthol hydrochloride in 50 ml. pyridine is added. The whole is refluxed two hours, then drowned in water. The pyridine is neutralized with 5N hydrochloric acid. The product precipitates, is filtered and dried. It is then fused with 1 g. of boric acid at 250°C. for 20 minutes. The product is recrystallized from methoxyethanol. It is chromatographed in chloroform through alumina using chloroform as eluant. The chloroform is stripped off and the product recrystallized from methoxyethanol and activated charcoal. Yield is 1.58 g. m.p. 169°–170 °C. λ max is 340 mµ.

This product is 2-(1-naphthyl)-naphth[1,2-d]oxazole. It brightens polyvinyl chloride and causes it to appear more clear than the control when incorporated uniformly therein in amounts of about 0.01 to 0.5 percent by weight. Also it has excellent lightfastness in this plastic.

It makes polyethylene appear much whiter and is faster to light than the untreated substrate.

The following are representative procedures for incorporating it uniformly into these plastics.

A steam heated two-roll Thropp-mill one roll at 300°F. and the other roll at 275°F. is used for mixing the compound of Example 1 with the plastic. 100 grams of polyvinyl chloride powder is placed in the nip and banded. When a workable molten mass is obtained, 20 milligrams of the oxazole compound is added. The band is cut at every pass for 50 passes. It is then transferred to a molding machine and molded at 300°F. into a sheet or film of 20 mil.

The film containing the oxazole compound is much brighter than a blank film similarly derived. Under ultra-violet light it shows a strong blue fluorescence.

When this procedure is applied to polyethylene the following conditions should be used.

A steam heated two-roll Thropp-mill one roll at 250°F. and the other roll at 100°C. is used for mixing. 100 grams of polyethylene beads are placed in the nip and banded. 20 milligrams of the compound is added to the banded polyethylene. The band is cut at every pass for 30 passes. It is then molded under pressure at 280°F. into a 20 mil sheet.

Appearance of the sheet is much whiter than an untreated sheet. In polyethylene it is superior in brightness to many of the known brighteners.

EXAMPLE 2

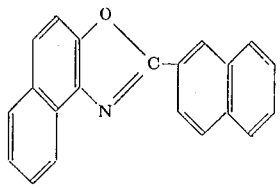

If in Example 1, 2-naphthoic acid is substituted in like amount for 1-naphthoic acid and 100 ml. of pyridine is used instead of 50 ml. pyridine, and the procedure otherwise followed, 1.05 g. of 2-(2-naphthyl)-naphth[1,2-d]oxazole is obtained m.p. 177°–178°C. λ max is 343 mµ.

It strongly brightens, and, clears polyvinyl chloride. It shows a strong brightening effect in polyethylene.

EXAMPLE 3

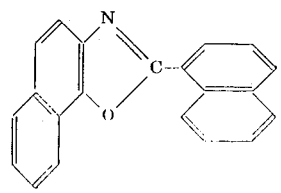

To 25 ml. thionyl chloride is added 1.72 g. (0.01 mole) of 1-naphthoic acid and the whole heated for two hours at reflux. Excess thionyl chloride is removed under reduced pressure, a small amount of benzene being added to remove residual thionyl chloride; 25 ml. pyridine is added.

To the above solution of 1-naphthoyl chloride, is added 1.96 g. (0.01 mole) of 2-amino-1-naphthol in 25 ml. pyridine. The whole is heated for 2 hours at reflux. When acylation is complete, the whole is drowned in water and acidified with hydrochloric acid. The resultant amide is filtered and dried.

Ring closure to the [2,1-d]oxazole is effected by fusing with 0.5 g. boric acid at 240°–250°C. for 15 minutes. Yield is 0.5 g. m.p. 194°–195°C. λ max is 350 mµ.

It gives a clear, and bright effect in polyvinyl chloride and has good fastness. It strongly brightens polyethylene.

EXAMPLE 4

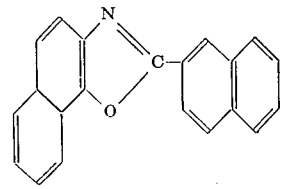

If in Example 3, 3.44 g. (0.02 mole) of 2-naphthoic acid are used instead of 1-naphthoic acid and 3.91 g. (0.02 mole) of 2-amino-1-naphthol are used but the procedure otherwise followed, 1.24 g. m.p. 189°C. of 2-[2-napthyl]-naphth[b2,1-d]oxazole is obtained. The ultra-violet spectrum shows λ max = 340 mµ.

It makes polyvinyl chloride clear and much brighter and has good lightfastness in this plastic. It brightens polyethylene.

EXAMPLE 5

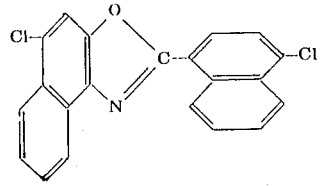

2 grams of the oxazole of Example 1 is dissolved in chloroform. Chloride is introduced over a period of 2 hours. The temperature rises several degrees during the reaction. When the reaction is complete, the chloroform is evaporated on a steam bath. The residue is recrystallized from methoxyethanol to give a product melting at 220°–230°C. λ max is 358 mµ.

This product is 2-[1-(4-chloronaphthyl)]-5-chloronaphth[1,2d]oxazole, which is also herein called a dichloro-2-naphthylnaphthoxazole for simplicity. It brightens polyvinyl chloride strongly and has excellent lightfastness. It also brightens polyethylene.

What I claim is:

1. A plastic of the group consisting of polyvinyl chloride and polyethylene plastics brightened by a substantially uniform content of about 0.01 to 0.5 percent by weight of a compound of the group consisting of 2-naphthylnaphthoxazoles and dichloro-2-naphthylnaphthoxazoles.

2. A brightened plastic according to claim 1 wherein the compound is a 2-naphthylnaphthoxazole.

3. A brightened plastic according to claim 1 wherein the plastic is polyvinyl chloride.

* * * * *

UNITED STATES PATENT OFFICE
CERTIFICATE OF CORRECTION

Patent No. 3,684,764          Dated August 15, 1972

Inventor(s) Bennett George Buell

It is certified that error appears in the above-identified patent and that said Letters Patent are hereby corrected as shown below:

First page, first column, after the inventor's address, insert -- assignor to American Cyanamid Company, Stamford, Conn. --.

Column 4, line 37: "[b2,1-d]" should read -- [2,1-d] --.
Column 4, line 63: "]1,2d]" should read -- [1,2-d] --.

Signed and sealed this 9th day of January 1973.

(SEAL)
Attest:

EDWARD M. FLETCHER, JR.
Attesting Officer

ROBERT GOTTSCHALK
Commissioner of Patents